US011325558B2

(12) United States Patent
Jang et al.

(10) Patent No.: US 11,325,558 B2
(45) Date of Patent: May 10, 2022

(54) AIRBAG APPARATUS

(71) Applicant: HYUNDAI MOBIS CO., LTD., Seoul (KR)

(72) Inventors: Rae Ick Jang, Yongin-si (KR); Su Hyun Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/072,773

(22) Filed: Oct. 16, 2020

(65) Prior Publication Data

US 2021/0114548 A1  Apr. 22, 2021

(30) Foreign Application Priority Data

Oct. 18, 2019  (KR) .................. 10-2019-0129891

(51) Int. Cl.
| | |
|---|---|
| *B60R 21/233* | (2006.01) |
| *B60R 21/262* | (2011.01) |
| *B60R 21/2338* | (2011.01) |
| *B60R 21/00* | (2006.01) |
| *B60R 21/261* | (2011.01) |

(52) U.S. Cl.
CPC ........ *B60R 21/233* (2013.01); *B60R 21/2338* (2013.01); *B60R 21/262* (2013.01); *B60R 2021/0004* (2013.01); *B60R 2021/0009* (2013.01); *B60R 2021/0048* (2013.01); *B60R 2021/23386* (2013.01); *B60R 2021/2615* (2013.01)

(58) Field of Classification Search
CPC .... B60R 2021/0004; B60R 2021/0009; B60R 2021/0023; B60R 2021/0048; B60R 2021/23161; B60R 2021/23308; B60R 2021/23324; B60R 2021/23382; B60R 2021/23386; B60R 2021/2615; B60R 21/205; B60R 21/233; B60R 21/2338; B60R 21/262

See application file for complete search history.

(56) References Cited

U.S. PATENT DOCUMENTS

| | | | | |
|---|---|---|---|---|
| 9,272,684 | B1 * | 3/2016 | Keyser | B60R 21/231 |
| 9,428,139 | B2 * | 8/2016 | Yamada | B60R 21/237 |
| 9,505,372 | B2 * | 11/2016 | Yamada | B60R 21/205 |
| 9,550,465 | B1 * | 1/2017 | EL-Jawahri | B60R 21/203 |
| 9,580,039 | B2 * | 2/2017 | Schneider | B60R 21/233 |
| 9,758,123 | B2 * | 9/2017 | Yamada | B60R 21/2338 |
| 10,023,144 | B2 * | 7/2018 | Taguchi | B60R 21/239 |
| 10,059,299 | B2 * | 8/2018 | Yamada | B60R 21/233 |

(Continued)

*Primary Examiner* — Laura Freedman
(74) *Attorney, Agent, or Firm* — NovoTechIP International PLLC

(57) ABSTRACT

An airbag apparatus may include: an inflator configured to jet gas in case of a collision of a vehicle; a first cushion inflated by the gas jetted by the inflator, and configured to support the head of a passenger in case of a head-on collision of the vehicle; a second cushion connected to the first cushion so as to be supported by the first cushion, and configured to suppress the head of the passenger from moving in a diagonal direction in case of an oblique collision of the vehicle; a connection tube configured to connect the first and second cushions such that the gas of the inflator moves from the first cushion to the second cushion; and a control tether connected to the first cushion and the connection tube.

6 Claims, 7 Drawing Sheets

(56) References Cited

U.S. PATENT DOCUMENTS

| | | | | |
|---|---|---|---|---|
| 10,099,646 B2* | 10/2018 | Jang | ................... | B60R 21/233 |
| 10,214,175 B2* | 2/2019 | Kobayashi | ........... | B60R 21/0136 |
| 10,293,777 B2* | 5/2019 | Paxton | ................... | B60R 21/239 |
| 10,363,898 B2* | 7/2019 | Maenishi | ............... | B60R 21/205 |
| 10,369,951 B2* | 8/2019 | Tabushi | ............... | B60R 21/0136 |
| 10,391,968 B2* | 8/2019 | Jaradi | ................... | B60R 21/231 |
| 10,434,969 B2* | 10/2019 | Yamada | ............. | B60R 21/2338 |
| 10,611,331 B2* | 4/2020 | Jang | ................... | B60R 21/233 |
| 10,632,959 B2* | 4/2020 | Jeong | ................... | B60R 21/2338 |
| 10,730,472 B2* | 8/2020 | Perez | ................... | B60R 21/205 |
| 10,773,679 B2* | 9/2020 | Jeong | ................... | B60R 21/26 |
| 10,787,146 B2* | 9/2020 | Jang | ................... | B60R 21/2338 |
| 10,814,821 B2* | 10/2020 | Park | ................... | B60R 21/233 |
| 10,821,932 B2* | 11/2020 | Kanegae | ............ | B60R 21/2338 |
| 2006/0163848 A1* | 7/2006 | Abe | ................... | B60R 21/231 |
| | | | | 280/729 |
| 2018/0361978 A1* | 12/2018 | Belwafa | ............... | B60R 21/233 |
| 2019/0009745 A1* | 1/2019 | Hikida | ................... | B60R 21/231 |
| 2020/0180547 A1* | 6/2020 | Ohara | ................... | B60R 21/232 |

* cited by examiner

AIRBAG APPARATUS

CROSS-REFERENCE TO RELATED APPLICATION

This application claims priority from and the benefit of Korean Patent Application No. 10-2019-0129891, filed on Oct. 18, 2019, which is hereby incorporated by reference for all purposes as if set forth herein.

BACKGROUND

Field

Exemplary embodiments of the present disclosure relate to an airbag apparatus, and more particularly, to an airbag apparatus which can suppress the head of a passenger from moving or turning in a diagonal direction in case of an oblique collision of a vehicle.

Discussion of the Background

In general, a vehicle includes airbags to protect passengers. The airbags are disposed at various places according to protection parts of the passenger. A driver seat airbag is installed in a steering wheel so as to protect the head of a driver, and a passenger seat airbag is installed at the front of the vehicle so as to protect the head of a passenger sitting next to the driver.

In case of a head-on or oblique collision of the vehicle, an electronic control module decides whether to explode a detonator of an inflator. When the inflator generates gas, an airbag cushion is inflated by the generated gas. As the regulations on vehicles are tightened to protect a passenger, the size of an airbag cushion is increased.

However, when the gas leaks from the airbag cushion after the airbag cushion is completed inflated, a support force or inflation force of the airbag cushion is reduced. In this case, it may be difficult to prevent the head of a passenger from moving in a diagonal direction from the airbag cushion.

Furthermore, when the size of the airbag cushion is increased, the inflation time of the airbag cushion is increased. Thus, in case of an oblique collision of the vehicle, the time required for constraining the head is increased. When the time required for the airbag cushion to constrain the head is increased, the head of the passenger may not be suppressed from moving in a diagonal direction. In this case, the head or neck of the passenger may be injured. Therefore, there is a need for a device capable of solving the problem.

SUMMARY

Various embodiments are directed to an airbag apparatus which can suppress the head of a passenger from moving or turning in a diagonal direction in case of an oblique collision of a vehicle.

In an embodiment, an airbag apparatus may include: an inflator configured to jet gas in case of a collision of a vehicle; a first cushion inflated by the gas jetted by the inflator, and configured to support the head of a passenger in case of a head-on collision of the vehicle; a second cushion connected to the first cushion so as to be supported by the first cushion, and configured to suppress the head of the passenger from moving in a diagonal direction in case of an oblique collision of the vehicle; a connection tube configured to connect the first and second cushions such that the gas of the inflator moves from the first cushion to the second cushion; and a control tether connected to the first cushion and the connection tube part.

The connection tube may be mounted on an inner surface of the second cushion.

The connection tube may be configured as a pair of connection tubes which are disposed on the inner surface of the second cushion so as to face each other.

The control tether may connect the pair of connection tubes.

The connection tube may be formed in a hollow cylinder shape.

The second cushion may be eccentrically disposed on an inboard side of the first cushion so as to avoid the head of the passenger in case of a head-on collision of the vehicle.

The airbag apparatus may further include a connection tether part configured to connect the first and second cushions so as to restrict the second cushion from being pushed to the outside of the first cushion by the weight of the head of the passenger.

The airbag apparatus in accordance with the embodiment of the present disclosure can prevent the head of a passenger from being turned in case of an oblique collision of the vehicle, thereby preventing an injury to the head or neck.

Furthermore, the second cushion may be eccentrically disposed on the inboard side of the first cushion so as to avoid the head of the passenger in case of a head-on collision of the vehicle, which makes it possible to prevent the neck of the passenger from being injured or bent to the rear side by the second cushion 300.

Furthermore, since the first and second cushions may be deployed by one inflator, the number of parts and the manufacturing cost can be reduced.

Furthermore, the use of one inflator can reduce the size of the first cushion in which the inflator is housed.

DETAILED DESCRIPTION OF THE ILLUSTRATED EMBODIMENTS

Hereinafter, an airbag apparatus will be described below with reference to the accompanying drawings through various exemplary embodiments. It should be noted that the drawings are not to precise scale and may be exaggerated in thickness of lines or sizes of components for descriptive convenience and clarity only.

Furthermore, the terms as used herein are defined by taking functions of the invention into account and can be changed according to the custom or intention of users or operators. Therefore, definition of the terms should be made according to the overall disclosures set forth herein.

Figure 1:
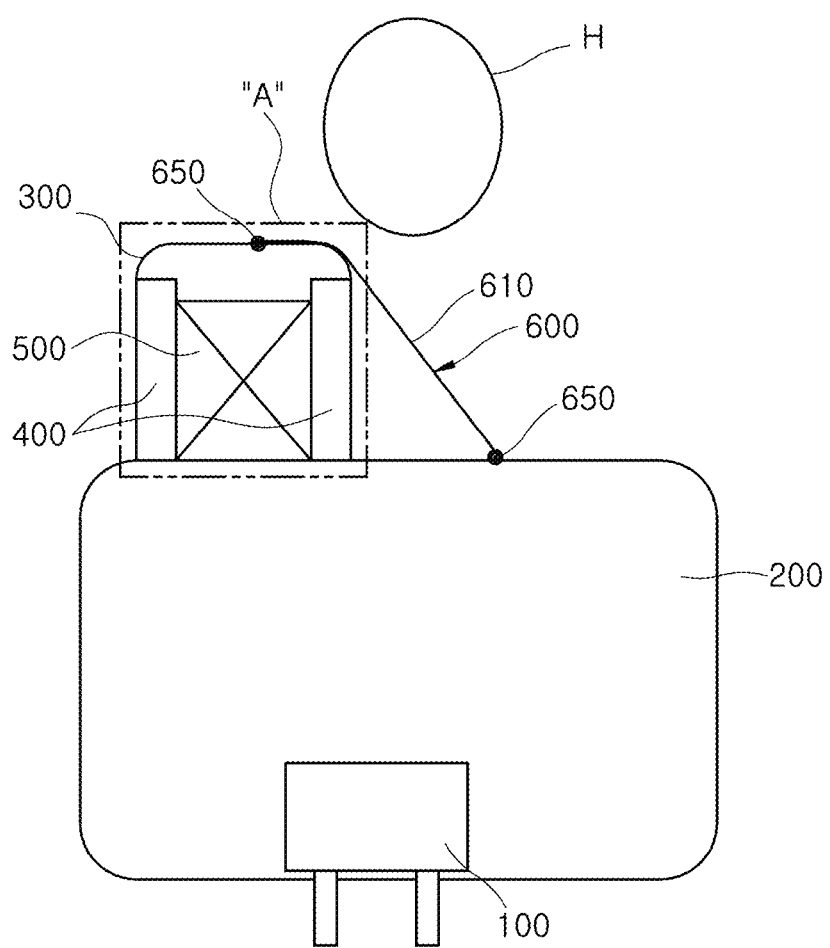
FIG. 1 is a plan view schematically illustrating an airbag apparatus in accordance with an embodiment of the present disclosure.
Figure 2:
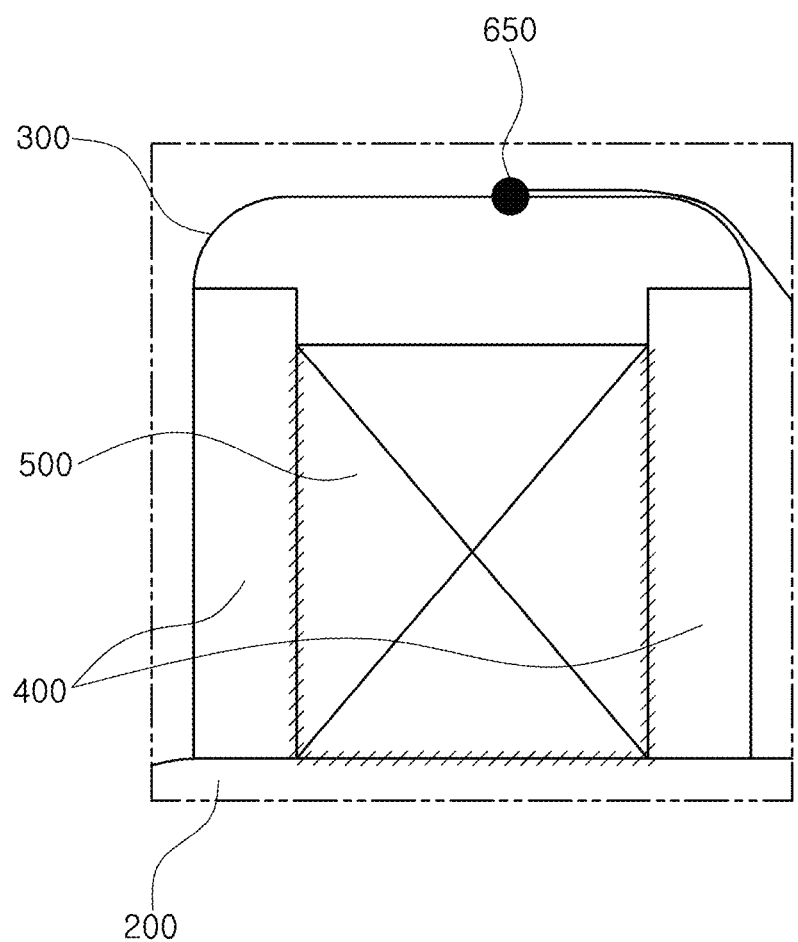
FIG. 2 is an expanded view schematically illustrating a portion "A" of FIG. 1.
Figure 3:
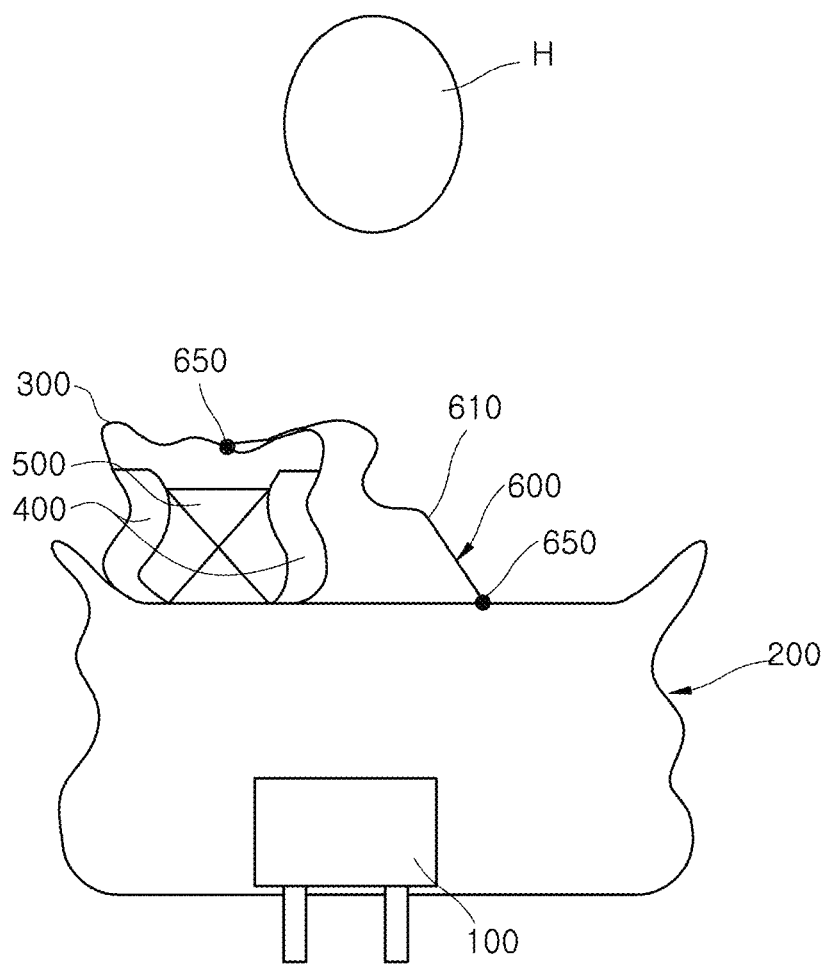
FIG. 3 is a configuration diagram schematically illustrating that first and second cushions of the airbag apparatus in accordance with the embodiment of the present disclosure are being inflated.
Figure 4:
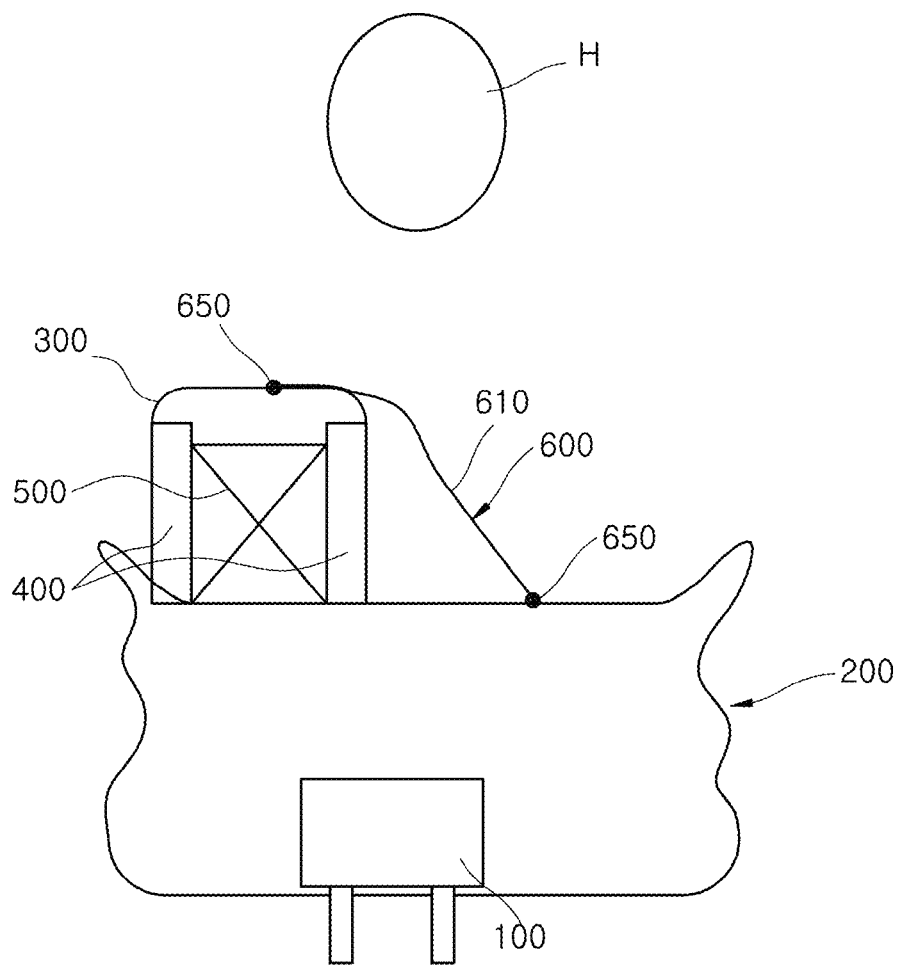
FIG. 4 is a configuration diagram schematically illustrating that the second cushion is completely deployed in the airbag apparatus in accordance with the embodiment of the present disclosure.
Figure 5:
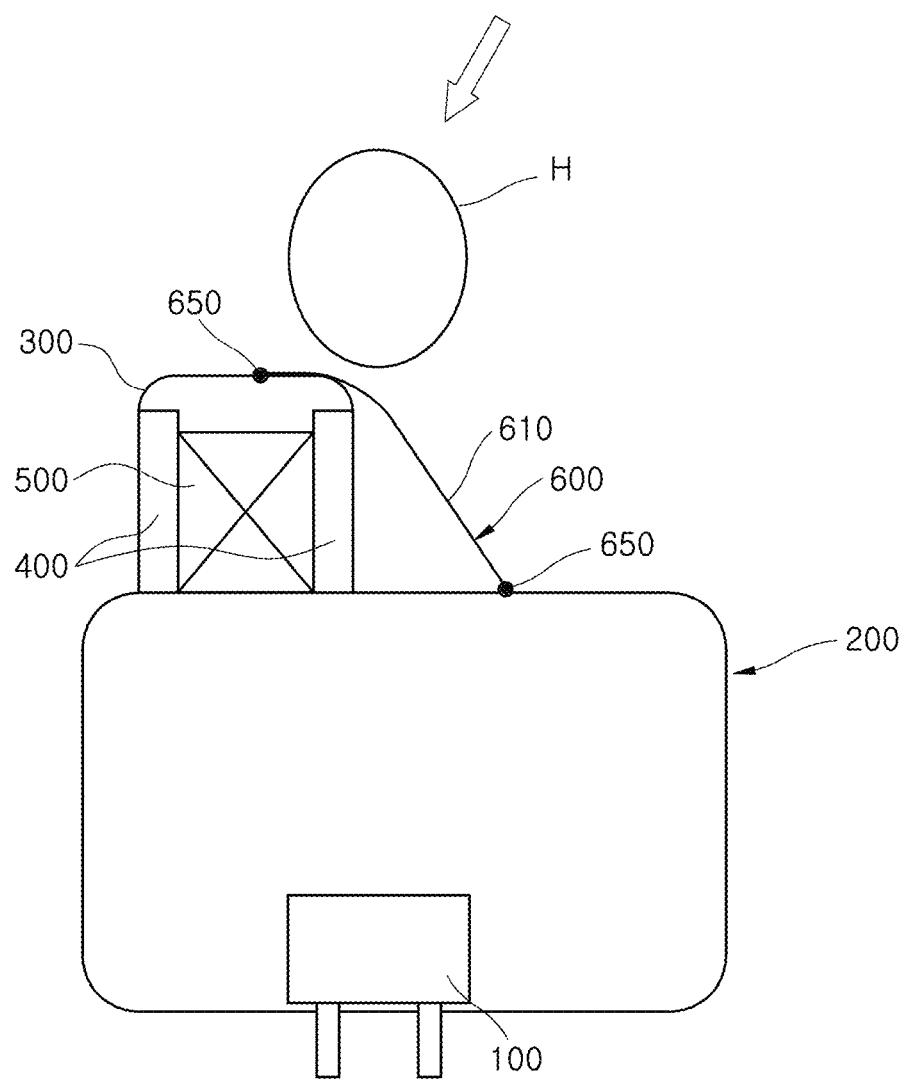
FIG. 5 is a configuration diagram schematically illustrating that the first and second cushions of the airbag apparatus in accordance with the embodiment of the present disclosure are completely deployed.
Figure 6:
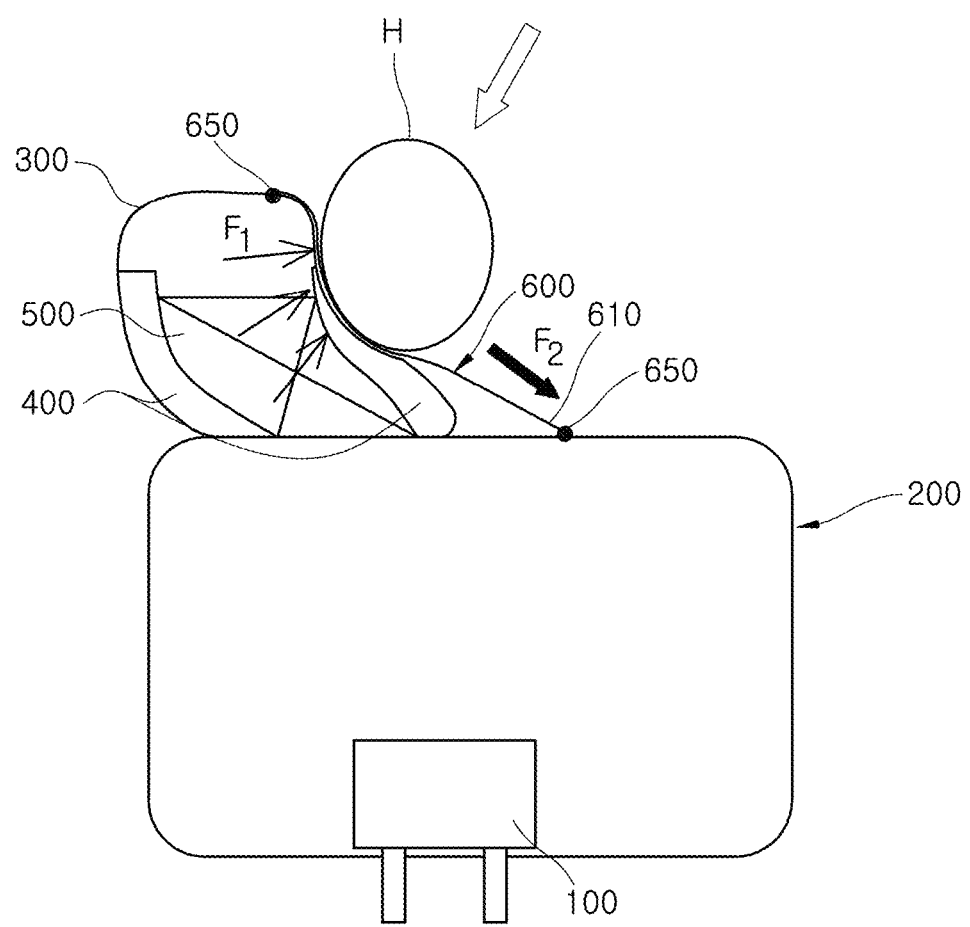
FIG. 6 is a configuration diagram schematically illustrating that the head of a passenger collides with the second cushion in the airbag apparatus in accordance with the embodiment of the present disclosure.
Figure 7:
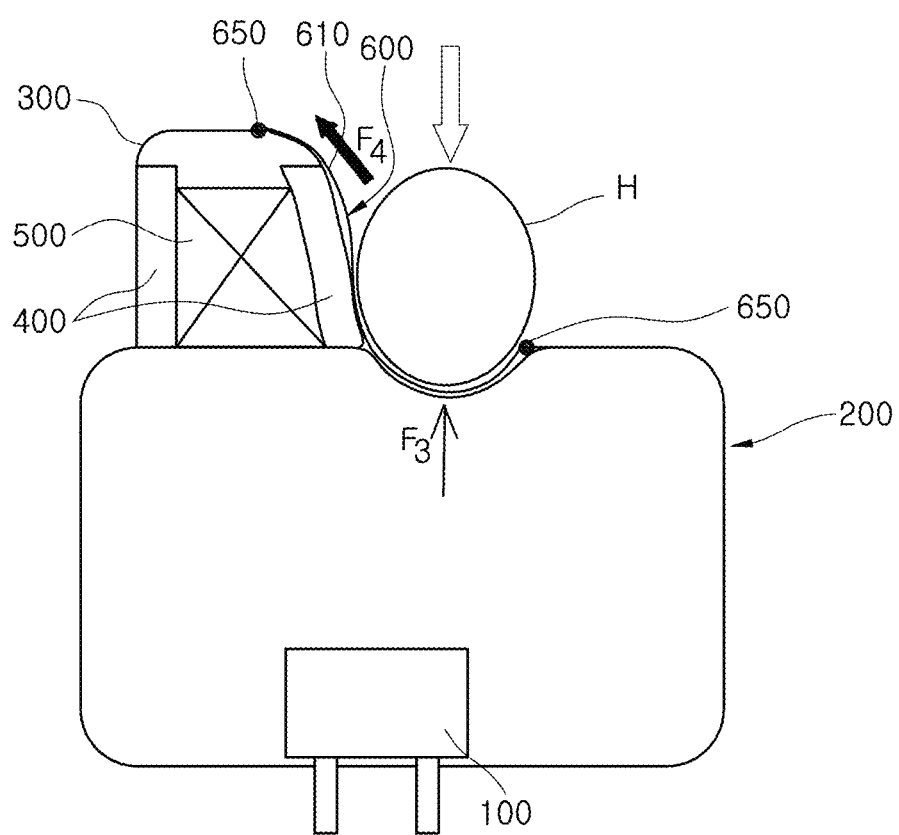
FIG. 7 is a configuration diagram schematically illustrating that the head of the passenger collides with the first cushion in case of a head-on collision of the vehicle in the airbag apparatus in accordance with the embodiment of the present disclosure.

FIG. 1 is a plan view schematically illustrating an airbag apparatus in accordance with an embodiment of the present disclosure, FIG. 2 is an expanded view schematically illustrating a portion "A" of FIG. 1, FIG. 3 is a configuration diagram schematically illustrating that first and second cushions of the airbag apparatus in accordance with the embodiment of the present disclosure are being inflated, FIG. 4 is a configuration diagram schematically illustrating that the second cushion is completely deployed in the airbag apparatus in accordance with the embodiment of the present disclosure, FIG. 5 is a configuration diagram schematically illustrating that the first and second cushions of the airbag apparatus in accordance with the embodiment of the present disclosure are completely deployed, FIG. 6 is a configuration diagram schematically illustrating that the head of a passenger collides with the second cushion in the airbag apparatus in accordance with the embodiment of the present disclosure, and FIG. 7 is a configuration diagram schematically illustrating that the head of the passenger collides with the first cushion in case of a head-on collision of the vehicle in the airbag apparatus in accordance with the embodiment of the present disclosure.

Referring to FIGS. 1 to 7, the airbag apparatus in accordance with the embodiment of the present disclosure includes an inflator 100, a first cushion 200, a second cushion 300, a connection tube 400 and a control tether 500.

The inflator 100 jets gas in case of a collision of a vehicle. The inflator 100 may be mounted in the first cushion 200.

The first cushion 200 is connected to the inflator 100, and supports the head H of a passenger in case of a head-on collision of the vehicle. The first cushion 200 is inflated by the gas jetted by the inflator 100. The first cushion 200 may be formed in a rectangular box shape when completely deployed. The first cushion 200 is supported by an instrument panel (not illustrated) at the inside front of the vehicle.

The second cushion 300 is connected to the first cushion 200 so as to be supported by the first cushion 200, and suppresses the head H of the passenger from moving in a diagonal direction in case of an oblique collision of the vehicle. That is, in case of the oblique collision of the vehicle, the second cushion 300 supports one side of the head H of the passenger while blocking the one side of the head H of the passenger. Therefore, the second cushion 300 may prevent the head H of the passenger from being turned while pushed to one side (left side in FIG. 1) of the second cushion 300, and shorten the time required for constraining the head H.

Since the head H of the passenger is prevented from being turned in case of an oblique collision of the vehicle, the head H or neck of the passenger may be prevented from being injured. Furthermore, the size of the first cushion 200 may not be increased in order to protect the head H of the passenger, or the increase in size of the first cushion 200 may be minimized.

The second cushion 300 is eccentrically disposed on the inboard side of the first cushion 200 in order to avoid the head H of a passenger in case of a head-on collision of the vehicle. The inboard side indicates the central area of the vehicle in the widthwise direction thereof. The width (the widthwise length of the vehicle) of the second cushion 300 is set to a value equal to or less than a half of the width of the first cushion 200. Although the second cushion 300 is deployed while inflated to the rear side in case of a head-on collision of the vehicle, the second cushion 300 may prevent the head H of the passenger from being pushed to the rear side, thereby preventing the neck of the passenger from being injured or bent to the rear side.

The airbag apparatus in accordance with the embodiment of the present disclosure further includes a connection tether part 600 which connects the first and second cushions 200 and 300 so as to restrict the second cushion 300 from spreading to the inboard side when the second cushion 300 is deployed.

At this time, one end (right end in FIG. 1) of the connection tether part 600 may be connected to the second cushion 300 or a position of the first cushion 200, spaced apart from the second cushion 300. The connection tether part 600 applies a tensile force to the second cushion 300 to pull the second cushion 300 toward the first cushion 200 when the first and second cushions 200 and 300 are inflated.

In case of an oblique collision of the vehicle, the connection tether part 600 and the second cushion 300 are deformed in a stepwise manner while absorbing the weight of the head H of the passenger. That is, the head H of the passenger is primarily constrained by the connection tether part 600, and then secondarily constrained by the second cushion 300. Therefore, since the time required for constraining the head H of the passenger is shortened in case of an oblique collision of the vehicle, a turn of the head H of the passenger may be suppressed to prevent an injury to the head H or neck of the passenger.

Furthermore, when the head H of the passenger is obliquely moved in a diagonal direction of the vehicle in case of an oblique collision of the vehicle, the connection tether part 600 may pull the second cushion 300 toward the first cushion 200 using a support force (reaction force) of the first cushion 200, thereby preventing the head H of the passenger from getting away or separating from the second cushion 300. Therefore, the sizes of the first and second cushions 200 and 300 may not be increased in order to protect the head H of the passenger.

When the head H of the passenger applies a load to the connection tether part 600 and the first cushion 200 in case of a head-on collision of the vehicle, the connection tether part 600 and the first cushion 200 absorb the weight of the head H of the passenger in a stepwise manner. At this time, when the first cushion 200 is contracted forward by the weight of the head H of the passenger, the reaction force of the second cushion 300 pulls the connection tether part 600. Thus, the weight of the head H of the passenger may be buffered by the tensile force of the connection tether part 600 and the reaction force of the second cushion 300.

The connection tether part 600 is disposed on the rear sides of the first and second cushions 200 and 300, such that the head H of the passenger comes in contact with the connection tether part 600. Therefore, when the head H of the passenger collides with the first or second cushion 200 or 300, the connection tether part 600 may primarily buffer the weight of the head H of the passenger.

The connection tether part 600 may be a cotton tether 610 (see FIG. 1) which partially covers a rear-side one surface of the first cushion 200 and a rear-side one surface of the second cushion 300. The rear-side one surface of the first cushion 200 and the rear-side one surface of the second cushion 300 correspond to portions which come into direct contact with the head H of the passenger. Both sides of the cotton tether 610 are connected to the first and second cushions 200 and 300 through connection sewing parts 650, respectively. The cotton tether 610 indicates a rectangular or elliptical tether having a width smaller than the length thereof. When the connection tether part 600 is the cotton tether 610, the cotton tether 610 is almost evenly contacted with the head H of the passenger, which makes it possible to prevent pressure from concentrating on a specific portion of the head H of the passenger. Therefore, the head H of the passenger may be prevented from being injured by the connection tether part 600.

The connection tether part 600 may include a plurality of line tethers to connect the first and second cushions 200 and 300. Furthermore, the connection tether part 600 may be one line tether to connect the first and second cushions 200 and 300. Both sides of the line tether 610 are connected to the first and second cushions 200 and 300 by the connection sewing parts 650, respectively. The line tether indicates a string-shaped or band-shaped tether which is slim and long. The number of line tethers may be properly designed according to the heights of the first and second cushions 200 and 300 or the size of the vehicle.

The connection tube 400 connects the first and second cushions 200 and 300 such that the gas of the inflator 100 moves from the first cushion 200 to the second cushion 300. Through the connection tube 400, the gas of the first cushion 200 is moved to the second cushion 300. A vent part (not illustrated) through which gas is discharged from the second cushion 300 may be disposed at an end of the connection tube 400.

The connection tube 400 is mounted on an inner surface of the second cushion 300. The connection tube 400 is configured as a pair of connection tubes 400 which are disposed on the inner surface of the second cushion 300 so as to face each other. As the pair of connection tubes 400 are disposed on the inner surface of the second cushion 300, the gas may be rapidly moved from the first cushion 200 to the second cushion 300.

The connection tube 400 is formed in a hollow cylinder shape. Alternatively, the connection tube 400 may be formed in a hollow polygonal cylinder shape. As the connection tube 400 is formed in a hollow shape, the gas may be easily moved from the first cushion 200 to the second cushion 300.

One side (bottom side in FIG. 1) of the control tether 500 is connected to the first cushion 200, and other sides (left and right sides in FIG. 1) of the control tether 500 are connected to the connection tubes 400. The control tether 500 is disposed in the second cushion 300, and connects the first cushion 200 and the connection tube 400 so as to control a flow of gas into the second cushion 300. The control tether 500 may connect the pair of connection tubes 400 and restrict the expansion of the connection tube 400.

Hereafter, the operation of the airbag apparatus in accordance with the embodiment of the present disclosure will be described. In the following descriptions, an operation of the airbag apparatus in case of an oblique collision of the vehicle and an operation of the airbag apparatus in case of a head-on collision will be sequentially described.

First, the operation of the airbag apparatus in case of an oblique collision of the vehicle will be described.

Referring to FIGS. 3 to 6, gas generated by the inflator 100 is injected into the first cushion 200 in case of an oblique collision of the vehicle. The first cushion 200 is deployed while inflated to the rear side of the vehicle. That is, the upper portion of the first cushion 200 is first deployed while inflated, and the lower portion of the first cushion 200 is then deployed. The gas of the first cushion 200 is introduced into the second cushion 300 through the connection tube 400.

The second cushion 300 is completely deployed before the first cushion 200 (see FIG. 4). At this time, the expansion of the connection tube 400 is restricted by the control tether 500.

Due to the oblique collision of the vehicle, the head H of the passenger is moved forward in a diagonal direction (see FIG. 6). As the head H of the passenger is moved in the diagonal direction, the head H of the passenger presses the second cushion 300. Therefore, the second cushion 300 may be contacted with the head H of the passenger, and prevent the turn of the head H, which makes it possible to shorten the time required for constraining the head H.

Furthermore, the head H of the passenger presses the connection tube 400 adjacent to the second cushion 300 while pressing the second cushion 300, thereby preventing the gas from leaking through the vent part of the second cushion 300. Thus, the pressure of the second cushion 300 is increased to restrict the behavior of the head H of the passenger. Since the head H is prevented from being rotated in case of an oblique collision of the vehicle, the head H or neck may be prevented from being injured.

When the head H of the passenger is obliquely moved to the inboard side of the vehicle, the connection tether part 600 pulls the second cushion 300 toward the first cushion 200 (outboard side) using a support force F2 of the second cushion 300. Thus, the head H may be prevented from getting away from the second cushion 300.

In case of an oblique collision of the vehicle, the weight of the head H may be first absorbed by a tensile force F2 of the connection tether part 600, and then absorbed by a buffering force F1 of the second cushion 300. At this time, the connection tether part 600 primarily absorbs the weight of the head H of the passenger through a pulling force of the first cushion 200, and the second cushion 300 secondarily absorbs the impact of the head H of the passenger while deformed by the weight of the head H of the passenger. The weight of the head H, transferred to the second cushion 300, is transferred to the first cushion 200 and thus tertiarily absorbed.

Next, the operation of the airbag apparatus in case of a head-on collision of the vehicle will be described.

Referring to FIG. 7, since the first cushion 200 is disposed in front of the head H of the passenger, the head H of the passenger is moved to the first cushion 200 in case of a head-on collision of the vehicle. At this time, the second cushion 300 is eccentrically disposed on the inboard side of the first cushion 200 in order to avoid the head H of the passenger in case of a head-on collision of the vehicle. Thus, although the second cushion 300 is deployed while inflated to the rear side in case of the head-on collision of the vehicle, the second cushion 300 may prevent the head H of the passenger from being pushed to the rear side, thereby preventing the head H or neck of the passenger from being injured or bent to the rear by the second cushion 300.

As the first cushion 200 is deformed by the weight of the head H of the passenger, the connection tether part 600 is pulled by the second cushion 300. Therefore, the weight of the head H of the passenger is primarily absorbed by a tensile force F4 of the connection tether part 600, and secondarily absorbed by a buffering force F3 of the first cushion 200.

The airbag apparatus in accordance with the embodiment of the present disclosure can prevent the head H of a passenger from being turned in case of an oblique collision of the vehicle, thereby preventing an injury to the head H or neck.

In accordance with the embodiment of the present disclosure, the second cushion 300 may be eccentrically disposed on the inboard side of the first cushion 200 so as to avoid the head H of the passenger in case of a head-on collision of the vehicle, which makes it possible to prevent the neck of the passenger from being injured or bent to the rear side by the second cushion 300.

Furthermore, since the first and second cushions 200 and 300 can be deployed by one inflator 100, the number of parts and the manufacturing cost can be reduced.

Furthermore, the use of one inflator 100 can reduce the size of the first cushion 200 in which the inflator 100 is housed.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. An airbag apparatus comprising:
    an inflator configured to jet gas in case of a collision of a vehicle;
    a first cushion inflated by the gas jetted by the inflator, and configured to support a head of a passenger in case of a head-on collision of the vehicle;
    a second cushion connected to and supported by the first cushion and configured to suppress the head of the passenger from moving in a diagonal direction in case of an oblique collision of the vehicle;
    a connection tube mounted on an inner surface of the second cushion and configured to connect the first and second cushions and direct the gas jetted by the inflator from the first cushion to the second cushion; and
    a control tether connected to the first cushion and the connection tube.

2. The airbag apparatus of claim 1, wherein the connection tube is configured as a pair of connection tubes which are disposed on the inner surface of the second cushion so as to face each other.

3. The airbag apparatus of claim 2, wherein the control tether connects the pair of connection tubes.

4. The airbag apparatus of claim 1, wherein the connection tube is formed in a hollow cylinder shape.

5. The airbag apparatus of claim 1, wherein the second cushion is eccentrically disposed on an inboard side of the first cushion so as to avoid the head of the passenger in case of a head-on collision of the vehicle.

6. The airbag apparatus of claim 1, further comprising a connection tether part configured to connect the first and second cushions so as to restrict the second cushion from being pushed to the outside of the first cushion by the weight of the head of the passenger.

\* \* \* \* \*